(12) United States Patent
Iversen et al.

(10) Patent No.: US 7,478,471 B2
(45) Date of Patent: Jan. 20, 2009

(54) METHOD FOR MOUNTING A DRIVE SHAFT OF A COMPRESSOR

(75) Inventors: Frank Holm Iversen, Padborg (DK); Heinz Otto Lassen, Flensburg (DE); Marten Nommensen, Flensburg (DE); Christian Petersen, Hattstedt (DE); Beate Sönksen, legal representative, Hattstedt (DE)

(73) Assignee: Danfoss Compressors GmbH, Flensburg (DE)

( * ) Notice: Subject to any disclaimer, the term of this patent is extended or adjusted under 35 U.S.C. 154(b) by 810 days.

(21) Appl. No.: 11/135,873

(22) Filed: May 24, 2005

(65) Prior Publication Data

US 2005/0275298 A1    Dec. 15, 2005

(30) Foreign Application Priority Data

May 26, 2004    (DE) .................. 10 2004 025 678

(51) Int. Cl.
  *H02K 15/00* (2006.01)
  *H02K 7/08* (2006.01)
  *F04B 17/03* (2006.01)
(52) U.S. Cl. .............. 29/596; 310/90; 417/423.12; 417/424.1
(58) Field of Classification Search .......... 310/90; 417/423.7, 423.12; 29/596
  See application file for complete search history.

(56) References Cited

U.S. PATENT DOCUMENTS

| 1,822,342 | A |   | 9/1931  | Ehrlich |
|---|---|---|---|---|
| 3,728,563 | A | * | 4/1973  | Stone ............................ 310/90 |
| 3,762,837 | A |   | 10/1973 | Ellis et al. ..................... 417/360 |
| 4,573,882 | A | * | 3/1986  | Watanabe et al. ............ 417/366 |
| 4,840,545 | A | * | 6/1989  | Moilanen ...................... 417/301 |
| 5,272,803 | A | * | 12/1993 | Harrison et al. ............... 29/596 |
| 5,497,039 | A | * | 3/1996  | Blaettner et al. .............. 310/51 |
| 5,677,584 | A | * | 10/1997 | Keck ............................ 310/90 |
| 6,095,768 | A |   | 8/2000  | Bianchi ....................... 417/415 |
| 6,247,223 | B1 | * | 6/2001  | Keck ............................ 29/596 |
| 6,553,645 | B2 | * | 4/2003  | Nakamura et al. ............ 29/596 |
| 6,842,967 | B2 | * | 1/2005  | Wingeier ...................... 29/598 |
| 2002/0005675 | A1 |   | 1/2002 | Johnston et al. |
| 2005/0111992 | A1 | * | 5/2005 | Iacocca ........................ 417/313 |

FOREIGN PATENT DOCUMENTS

| DE | 953 718 | 11/1956 |
|---|---|---|
| EP | 0 524 552 A1 | 7/1992 |

\* cited by examiner

*Primary Examiner*—Burton Mullins
(74) *Attorney, Agent, or Firm*—McCormick, Paulding & Huber LLP

(57) ABSTRACT

The invention concerns a method for mounting a drive shaft (19) of a compressor, particularly a hermetical refrigerant compressor, which has a motor with a stator (1) and a rotor (23), connected with the drive shaft (19) and located in a rotor opening (4) of the stator (1), a first bearing support (8) and a second bearing support (29) being connected with the stator (1), a first bearing (15) for the drive shaft (19) being mounted in the first bearing support (8) and a second bearing (28) for the drive shaft (19) being mounted in the second bearing support (29). It is endeavoured to provide a method for mounting a drive shaft, in which the use of components with relatively large manufacturing tolerances will still result in a good alignment of the drive shaft in relation to the stator. For this purpose, at least the first bearing support (8) is provided with a positioning stop for the first bearing (15) after mounting the first bearing support (8) on the stator (1).

20 Claims, 2 Drawing Sheets

METHOD FOR MOUNTING A DRIVE SHAFT OF A COMPRESSOR

CROSS-REFERENCE TO RELATED APPLICATIONS

Applicant hereby claims foreign priority benefits under U.S.C. § 119 from German Patent Application No. 10 2004 025 678.0, filed on May 26, 2004 the contents of which are incorporated by reference herein.

FIELD OF THE INVENTION

The invention concerns a method for mounting a drive shaft of a compressor, particularly a hermetical refrigerant compressor.

BACKGROUND OF THE INVENTION

Refrigerant compressors have become products manufactured in large numbers, and should therefore be manufactured in the most cost effective manner possible. As, however, refrigerant compressors are practically operating all the year round, the energy consumption of the motor, which is required for driving the compressor unit, must be kept as small as possible. This again requires that, for example, the rotor and the stator are assembled with the best possible mutual alignment to keep the air gap between rotor and stator small, which reduces energy losses.

U.S. Pat. No. 6,095,768 shows a refrigerant compressor with a cup-shaped stator housing, whose upper end is open. The open end is bridged by a crossover. Self-aligning bearings for the drive shaft are inserted both in the crosshead and in the bottom of the stator housing. Even though these bearings permit a certain deviation of the drive shaft from the axis of the stator, a relatively exact alignment of the crosshead must be ensured, so that the crosshead is perpendicular to the drive shaft.

Another refrigerant compressor is known from U.S. Pat. No. 3,762,837. Here, the drive shaft is supported on both sides of a crankpin arrangement. The rotor is located on the other side of a bearing. Both bearings are radially displaceable and after mounting the motor and the compressor arrangement they have to be individually aligned and fixed to ensure a uniform air gap between the rotor and the stator. For the alignment, screws are loosened and the bearings displaced. Then the screws are tightened again. Thus, the bearings are only held by means of clamping.

EP 0 524 552 A1 shows a hermetical refrigerant compressor with double-supported drive shaft, the upper bearing being fixed in a block. The lower bearing is fixed on the stator by means of a holding element, so that the rotor can align itself in relation to the stator of the motor.

In all cases, relatively accurately manufactured components are required to keep the air gap between the rotor and the stator small and to align the drive shaft perpendicularly to the bearings. A "leaning" drive shaft will eventually cause relatively heavy wear on the bearings. Further, an insufficient alignment causes frictional losses in the bearings, which again cause increased energy consumption.

SUMMARY OF THE INVENTION

The invention is based on the task of providing a method for mounting a drive shaft, which ensures a good alignment of the drive shaft to the stator, also when using components with relatively large manufacturing tolerances.

With a method as mentioned in the introduction, this task is solved in that at least the first bearing support is provided with a positioning stop for the first bearing after mounting the first bearing support on the stator.

With this method, a uniform air gap between the rotor and the stator is achieved, which can even be heavily reduced. Frictional losses in the bearings are avoided. This also applies, when relatively cheap sheet metal parts are used for the compressor, that is, parts with relatively large manufacturing tolerances. Firstly, the first bearing support is mounted on the stator. This gives the bearing support an unchangeable position in relation to the rotor opening. Then, the positioning stop for the first bearing can be manufactured with a fixed dependence on the position of the rotor opening. Thus, the positioning stop is not manufactured until after the mounting of the first bearing support, but after the manufacturing, it is no longer changed in relation to the rotor opening. When the first bearing is then aligned on the positioning stop, the first bearing has an exact concentrical alignment in relation to the rotor opening.

Preferably, an edge of an opening is used as positioning stop, said edge being manufactured after mounting the bearing support on the stator. The first bearing is then inserted in the opening and is then aligned to be exactly concentrical to the rotor opening. Instead of an opening, also an impressing can be used.

Preferably, with a vertically aligned drive shaft, the bearing support of the upper bearing is fixed on the stator, and then the positioning stop is formed. In most refrigeration compressors the motor is made with a vertically oriented drive shaft. The drive shaft then "hangs" on the upper bearing, in whose vicinity usually also the crank pin for driving the compressor arrangement is located. In this area, an exact alignment of the drive shaft in the rotor opening is particularly important.

It is also advantageous, when a tool is used for manufacturing the positioning stop, at least a part of this tool being located concentrically in the rotor opening. The rotor opening itself is used for centring the tool for the manufacturing of the positioning stop. Thus, it is ensured that the positioning stop has exactly the desired alignment to the rotor opening.

It is particularly preferred that the part fills the cross-section of the rotor opening. Thus, the rotor opening or at least an axial section of it is filled with the tool, so that the tool is practically no longer radially displaceable in the rotor opening. When, then the positioning stop is formed, the positioning stop is aligned concentrically to the rotor opening with a high accuracy.

Preferably, a punch is used as tool. With a punch, for example, an opening can be punched, whose edge then serves as positioning stop.

Preferably, a bearing support is used, whose opening has short measure in relation to the bearing, the opening being extended to the measure of the bearing. When using a punch, this has the advantage that after fixing the bearing support only a fine punch step is required to bring the opening to the final measure. This further simplifies the manufacturing process, as only little material has to be removed, which means that the forces required to manufacture the final opening are smaller.

Alternatively or additionally, it is ensured that a calotte bearing is used as bearing, an area surrounding the opening being shaped to a bearing shell by means of an impressing step. Also in this case, the "local" manufacturing ensures that the centre of the bearing shell lies exactly on the axis of the stator.

Preferably, the second bearing is mounted on the second bearing support, aligned centrically to the rotor opening by means of an auxiliary tool, which is fixed at at least two alignment positions on the stator, the second bearing support then being fixed on the stator. Thus, an overcorrection is avoided.

It is preferred that holes in the metal sheets of the stator are used as alignment positions, said holes being made together with the rotor opening. The stator is usually made of stacked metal sheets, in which the rotor opening is made in that all the metal sheets are provided with a punching. When making this punching, holes can be punched at the same time for later use as fixing for the auxiliary tool. These holes are then positioned in relation to the rotor opening with a very high accuracy.

It is also advantageous that the second bearing is aligned after mounting on the drive shaft. In this case, it is ensured that the axis of the drive shaft corresponds exactly to the axis of the stator.

BRIEF DESCRIPTION OF THE DRAWINGS

In the following the invention is described on the basis of a preferred embodiment in connection with the drawings, showing.

DETAILED DESCRIPTION OF THE PREFERRED EMBODIMENTS

Figure 1:
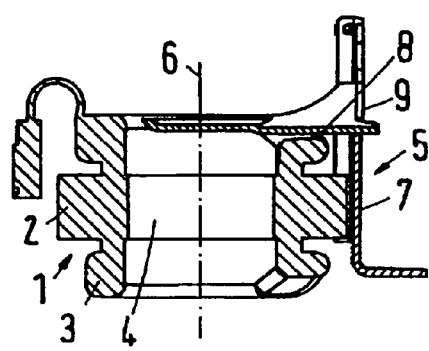
FIG. 1 is a schematic cross-section through a stator.

FIG. 1 shows a stator 1 of a motor, which is used for driving a compressor, particularly a refrigerant compressor. The stator 1 has a sheet pack 2 and a coil, of which coil ends 3 are shown. The sheet pack 2 surrounds a rotor opening 4. The rotor opening 4 is made in that already during the punching; the sheets forming the sheet pack 2 are provided with a central opening, so that the rotor opening 4 occurs, when the sheets of the sheet pack 2 are stacked.

A compressor block 5 is mounted and fixedly connected, for example by welding, on the outside of the sheet pack 2. The compressor block 5 can, for example, be a sheet metal part. The compressor block 5 has a basic unit 7 extending substantially parallel to the axis 6 of the stator 1, on which unit 7 a first bearing support 8 is fixed, for example by welding. After fixing on the basic unit 7, the first bearing support 8 forms a one-side suspended beam, which extends across the rotor opening 4. Both the basic unit 7 and the first bearing support 8 can be made in a cost-effective manner from punched and shaped sheet metal parts. Above the first bearing support 8, the basic unit 7 has a mounting opening 9, which will eventually serve the accommodation of the compressor unit itself.

In the section of the first bearing support 8, which could also be called "upper bearing support", crossing the rotor opening 4, an opening 10 is made for a first bearing, which is intended for supporting the drive shaft. For this purpose, a lower support part 11 of a punching device, for example an expansion mandrel, is inserted in the stator opening 4. The lower support part 11 fills the stator opening 4, and is no longer movable in the radial direction. The lower support part 11 is engaged against the lower side of the first bearing support 8. An upper support part 12 of the punching device is mounted on the first bearing support 8 from the upper side, before a punching tool 13 punches the opening 10 in the first bearing support 8. This opening 10 is thus exactly concentrical to the axis 6 of the stator opening 4, no matter if the first bearing support 8 has been mounted exactly enough on the basic unit 7 of the compressor block 5 and thus on the stator 1 or not. The exact alignment of the opening 10 in relation to the rotor opening 4 will not be changed during the following mounting steps, as the compressor block 5 remains fixedly mounted on the stator 1.

The opening 10 in the first bearing support 8 can also be "premanufactured" with a predetermined short measure. The first bearing will not yet fit into this pre-manufactured opening 10. However, the opening can be extended to its final measure by means of a fine punching step. This further simplifies the production process, as only little material has to be removed and the required forces are smaller.

When a calotte bearing is used as first bearing (not shown), the area of the first bearing support 8 surrounding the first opening 10 can be shaped by means of an impressing step in such a manner that a bearing shell 14 for the calotte bearing appears. Also in this case, the process shown ensures that the centre of the bearing shells is placed exactly on the axis 6 of the stator 1.

Figure 5:
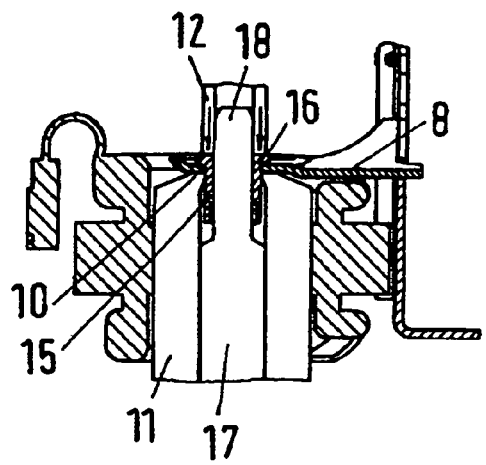
FIG. 5 is a sectional view of the stator with inserted upper bearing.

FIG. 5 now shows that a bearing bush 15 is inserted in the opening 10. The bearing bush 15 can be made of sintered metal and has a circumferential, radially projecting flange 16, which bears on the first bearing support 8 from the upside. The bearing bush 15 is pressed into the first bearing support 8, a control device 17, which is guided in the lower support part 11, fixing the radial and axial position of the bush 15; The force required for pressing in can be supplied by the upper support part 12 of the punch. Instead of the upper support part 12, also a corresponding pressing tool can be used. During pressing, the upper support part 12 is guided on the control device 17, or rather a projection 18 penetrating the opening 10, so that here radial forces cannot occur either, which could lead to a displacement of the bearing bush 15.

Figure 6:
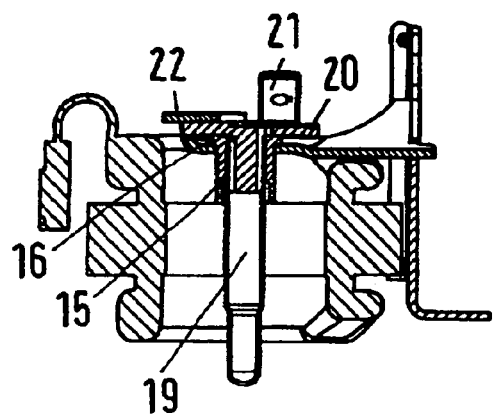
FIG. 6 is a sectional view of the stator with inserted drive shaft.

FIG. 6 shows that a drive shaft 19 is inserted in the bearing bush 15. The drive shaft 19 now has an axis, which is congruent with the axis 6 of the stator 1. Under the effect of the gravity it initially hangs vertically downwards. At the upper end, the drive shaft 19 has a carrier disc 20, on which a crankpin 21 and a balancing weight 22 are fixed. The carrier disc 20 bears on the flange 16 of the bearing bush 15, so that here the bearing bush 15 does not only form a radial bearing, but also an axial bearing. The drive shaft 19 can simply be inserted in the bearing bush 15 from the top.

Figure 7:
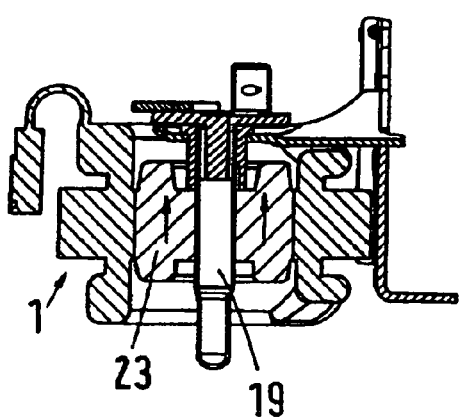
FIG. 7 is a sectional view with inserted rotor.

From FIG. 7 it appears that in a further mounting step a rotor 23 is pressed onto the drive shaft 19, whereas a hold-on (not shown in detail) at the crank-side upper end of the drive shaft 19 adopts the pressing forces. To simplify the pressing process, the rotor 23 can be heated up before mounting. After cooling off, it shrinks onto the shaft.

Figure 2:
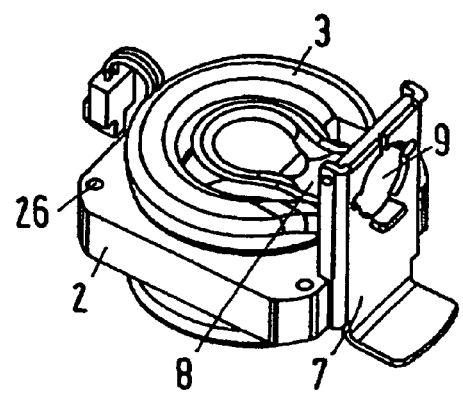
FIG. 2 is a perspective view of the stator.
Figure 3:
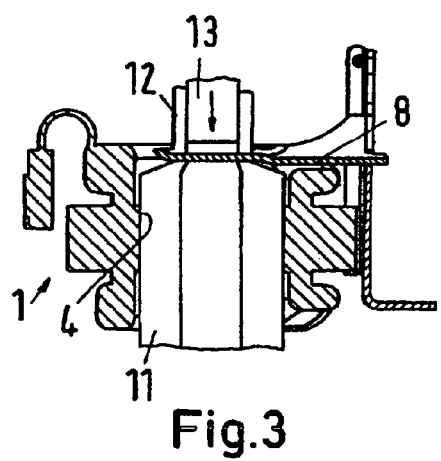
FIG. 3 is a sectional view according to FIG. 1 with inserted tool.
Figure 4:
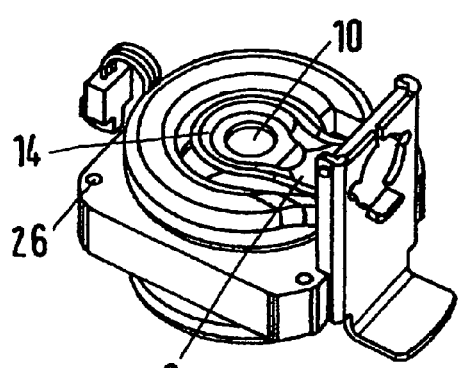
FIG. 4 is a perspective view according to FIG. 2 after forming an opening for the first bearing.
Figure 8:
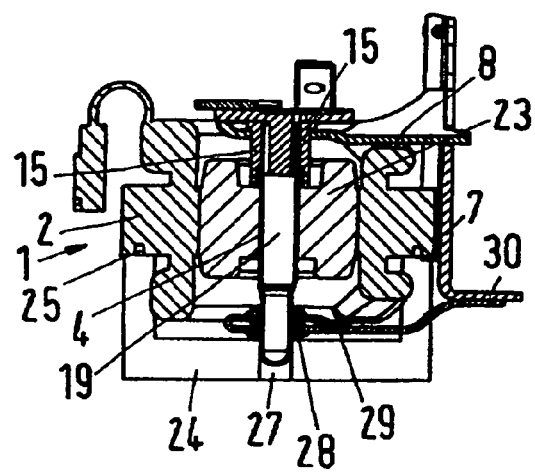
FIG. 8 is a sectional view with inserted lower bearing.

FIG. 8 shows the last step of the mounting. An auxiliary tool 24 with pins 25 is inserted in the positioning openings 26 (FIGS. 2 and 4), which are formed in the sheets of the sheet pack 2. These positioning openings 26 are manufactured in the same punching process, in which also the cut-outs are punched, which will form the rotor opening 4. Thus, the positioning openings 26 have a very accurate spatial relation to the rotor opening 4.

The auxiliary tool 24 has a central opening 27, into which the top of the drive shaft 19 is inserted. Before applying the auxiliary tool 24, however, a second bearing 28, which is inserted in a second bearing support 29, is pushed onto the drive shaft 19. When, through the bearing bush 15 forming the first bearing, the drive shaft 19, and the auxiliary tool 24, have been positioned accurately in relation to the sheet pack 2 of the stator 1, the second bearing support 29 is fixed, for example by welding, on a leg 30 projecting from the basic unit 7. However, the second bearing support 29 can also be fixed on the leg 30 by screwing or riveting.

For the second bearing 28, a calotte bearing is preferred, to balance possible angle errors between the bearing support 29 and the drive shaft 19, if the second bearing support 29 does not extend exactly at right angles to the drive shaft 19.

After fixing the second bearing support 29 on the basic unit 7, it is thus ensured that the centres of the bearing bush 15 and the second, or lower, bearing 28 as well as the longitudinal axes of the two bearings lie exactly in the longitudinal axis 6 of the stator.

All mounting steps shown can to a large extent be automated. Also when using formed sheet metal parts, a high-precision alignment of the rotor 23 in relation to the stator 1 can thus be realised. This permits the reduction of the air gap between the rotor 23 and the stator sheet pack 2, which will also later give a cost-effective mode of operation.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method for mounting a drive shaft of a compressor having a motor with a stator and a rotor, the method comprising the steps of:
    mounting a first bearing support on the stator; and providing a positioning stop for a first bearing in the first bearing support after mounting the first bearing support on the stator, wherein, in a compressor with a vertically aligned drive shaft, the first bearing support is an upper bearing support.

2. A method for mounting a drive shaft of a compressor having a motor with a stator and a rotor, the method comprising the steps of:
    mounting a first bearing support on the stator; and providing a positioning stop for a first bearing in the first bearing support after mounting the first bearing support on the stator, wherein the step of providing the positioning stop for the first bearing includes concentrically locating a tool at least partially in a rotor opening of the stator and using the tool to manufacture the positioning stop for the first bearing.

3. The method according to claim 2, wherein the part of this tool being located concentrically in the rotor opening fills the cross-section of the rotor opening.

4. The method according to claim 2, wherein the tool is a punch.

5. The method according to claim 1, wherein the step of providing the positioning stop for the first bearing includes manufacturing an opening in the first bearing support after the first bearing support is mounted on the stator, wherein an edge of the opening is used as the positioning stop for the first bearing.

6. The method according to claim 1, wherein the step of providing the positioning stop for the first bearing includes concentrically locating a tool at least partially in a rotor opening of the stator and using the tool to manufacture the positioning stop for the first bearing.

7. The method according to claim 6, wherein the part of this tool being located concentrically in the rotor opening fills the cross-section of the rotor opening.

8. The method according to claim 6, wherein the tool is a punch.

9. The method according to claim 5, wherein manufacturing the opening in the first bearing support includes enlarging a pre-existing opening to a measure of the bearing, the pre-existing opening having a short measure in relation to the first bearing.

10. The method according to claim 5, wherein manufacturing the opening in the first bearing support further includes impressing the opening to form a bearing shell, the bearing shell shaped to accommodate a calotte bearing used as the first bearing.

11. The method according to claim 1, further comprising the steps of:
    mounting a second bearing on a second bearing support;
    aligning the second bearing and the second bearing support centrically to a rotor opening of the stator by means of an auxiliary tool fixed to at least two alignment positions on the stator; and
    fixing the second bearing support on the stator after aligning the second bearing and the second bearing support.

12. The method according to claim 11, wherein holes in the metal sheets of the stator are used as alignment positions, said holes being made together with the rotor opening.

13. The method according to claim 11, wherein the second bearing is aligned after mounting on the drive shaft.

14. The method according to claim 2, wherein, in a compressor with a vertically aligned drive shaft, the first bearing support is an upper bearing support.

15. The method according to claim 2, wherein the step of providing the positioning stop for the first bearing includes manufacturing an opening in the first bearing support after the first bearing support is mounted on the stator, wherein an edge of the opening is used as the positioning stop for the first bearing.

16. The method according to claim 15, wherein manufacturing the opening in the first bearing support includes enlarging a pre-existing opening to a measure of the bearing, the pre-existing opening having a short measure in relation to the first bearing.

17. The method according to claim 15, wherein manufacturing the opening in the first bearing support further includes impressing the opening to form a bearing shell, the bearing shell shaped to accommodate a calotte bearing used as the first bearing.

18. The method according to claim 2, further comprising the steps of:
    mounting a second bearing on a second bearing support;
    aligning the second bearing and the second bearing support centrically to a rotor opening of the stator by means of an auxiliary tool fixed to at least two alignment positions on the stator; and
    fixing the second bearing support on the stator after aligning the second bearing and the second bearing support.

19. The method according to claim 18, wherein holes in the metal sheets of the stator are used as alignment positions, said holes being made together with the rotor opening.

20. The method according to claim 18, wherein the second bearing is aligned after mounting on the drive shaft.

* * * * *